(12) United States Patent
Garing

(10) Patent No.: US 9,493,241 B2
(45) Date of Patent: Nov. 15, 2016

(54) LATTICE PANEL STRUCTURE AND METHOD

(71) Applicant: Francis Xavier Garing, Atlanta, GA (US)

(72) Inventor: Francis Xavier Garing, Atlanta, GA (US)

(73) Assignee: B/E Aerospace, Inc., Wellington, FL (US)

( * ) Notice: Subject to any disclaimer, the term of this patent is extended or adjusted under 35 U.S.C. 154(b) by 9 days.

(21) Appl. No.: 14/661,596

(22) Filed: Mar. 18, 2015

(65) Prior Publication Data
US 2016/0272326 A1    Sep. 22, 2016

(51) Int. Cl.
*A47B 23/00* (2006.01)
*B64D 11/06* (2006.01)

(52) U.S. Cl.
CPC ................................. *B64D 11/0638* (2014.12)

(58) Field of Classification Search
CPC ................ B64D 11/0638; B60N 3/004; B60N 31/06; B65D 2519/00034; B65D 2519/00308; B65D 2519/00363; B65D 2519/00939; A47B 3/12
USPC .............. 108/42, 44, 45, 57.25, 57.29, 51.3; 297/163; 52/180
See application file for complete search history.

(56) References Cited

U.S. PATENT DOCUMENTS

| | | | | |
|---|---|---|---|---|
| 5,030,343 A | * | 7/1991 | Urriola | E02B 11/00 210/170.03 |
| 5,188,246 A | * | 2/1993 | Maxworthy | A47F 5/0846 108/152 |
| D383,554 S | * | 9/1997 | Hart | D25/102 |
| 5,706,737 A | * | 1/1998 | Whitehead | A47B 96/02 108/152 |
| 6,148,740 A | * | 11/2000 | Jackel | B64G 1/22 108/51.11 |
| 6,467,118 B2 | * | 10/2002 | Dumlao | B63B 5/00 14/73 |
| 6,736,569 B2 | | 5/2004 | Lee | |
| 6,758,518 B2 | * | 7/2004 | Ingram | B60N 3/004 108/44 |
| 7,013,814 B2 | * | 3/2006 | Modesitt | B65D 19/0002 108/51.3 |
| 7,303,800 B2 | * | 12/2007 | Rogers | B32B 3/02 404/34 |
| D593,220 S | * | 5/2009 | Reed | D25/153 |
| 8,091,959 B2 | * | 1/2012 | Berger | B60R 11/00 108/134 |

(Continued)

FOREIGN PATENT DOCUMENTS

EP    0589054 A1    3/1994
EP    2258544 A1    12/2010

OTHER PUBLICATIONS

International Search Report for PCT/US15/21218 dated Jun. 23, 2015.

*Primary Examiner* — Jose V Chen
(74) *Attorney, Agent, or Firm* — Shumaker, Loop & Kendrick, LLP

(57) ABSTRACT

A three dimensional lattice panel structure having a multitude of mutually offset holes formed in a respective top and bottom of the panel and intersecting to form voids with interspersed support posts interconnecting the top and bottom of the panel in areas not encompassed by the mutually offset holes.

9 Claims, 5 Drawing Sheets

(56) References Cited

U.S. PATENT DOCUMENTS

| | | | |
|---|---|---|---|
| 8,191,486 B2* | 6/2012 | Apps | B65D 19/0018 |
| | | | 108/53.3 |
| 8,696,241 B2* | 4/2014 | Lee | E01C 13/083 |
| | | | 404/36 |
| 8,863,674 B2* | 10/2014 | Smolenaers | B65D 19/0016 |
| | | | 108/51.11 |
| 9,249,570 B2* | 2/2016 | Jean | E04B 5/023 |
| 2006/0130712 A1* | 6/2006 | Wang | B65D 19/0075 |
| | | | 108/57.25 |
| 2010/0043678 A1* | 2/2010 | Linares | B32B 3/12 |
| | | | 108/57.25 |
| 2011/0187163 A1* | 8/2011 | Westerink | B60N 3/004 |
| | | | 297/163 |
| 2012/0073479 A1* | 3/2012 | Apps | B65D 19/0012 |
| | | | 108/42 |
| 2013/0169009 A1 | 7/2013 | Peterson et al. | |
| 2015/0068435 A1* | 3/2015 | Maslakow | B64D 11/0638 |
| | | | 108/42 |

* cited by examiner

LATTICE PANEL STRUCTURE AND METHOD

PRIORITY CLAIM

This application claims priority from U.S. Provisional Patent Application No. 61/955,405, filed Mar. 19, 2014, the entire contents of which are incorporated into this application by reference.

TECHNICAL FIELD AND BACKGROUND OF THE INVENTION

This invention relates to a light weight panel structure that exhibits a three dimensional lattice structure fabricated from a homogenous material through a two sided or split draw manufacturing process such as machining, injection molding, casting or three dimensional printing, and a method of producing such panels. Such three dimensional structures are most often associated with chemical structures formed from regular, periodic arrays of atoms and molecules, while two dimensional lattices are most often associated with structures or patterns of strips crossing each other with square or diamond-shaped spaces left between. The three dimensional lattice panels according to the various aspects of the invention can be used for components such as tray tables and other components that require light weight and rigid performance. These structures will be particularly useful in aircraft, where weight reduction is an important factor in decreasing fuel consumption and improving aircraft performance.

The structure is characterized by a two dimensional pattern of holes formed on opposing sides, with the pattern on one side offset from the opposing side such that only parts of the holes on opposing sides overlap. This allows removal of material while leaving a series of support posts orthogonal to the machining tool direction or injection molding draw direction. The combination of posts and thin material sections created by this geometry results in a three dimensional lattice structure that is rigid in both bending and torsion.

SUMMARY OF THE INVENTOR

It is therefore an object of the present invention to provide a lattice panel structure that can be produced out of a single homogenous material instead of being a composite structure that is bonded, welded, or otherwise fixed together.

It is another object of the present invention to provide a lattice panel structure that can be produced using a single process, such as machining, injection molding, casting or three-dimensional printing, instead of requiring multiple production and assembly processes.

It is another object of the present invention to provide a lattice panel structure with mechanical properties that can be accurately duplicated since it is comprised of a single homogenous material.

It is another object of the present invention to provide a lattice panel structure that does not require use of any adhesives.

These and other objects and advantages of the invention are achieved by providing a three dimensional lattice panel structure, that includes a panel having a multitude of mutually offset holes formed in a respective spaced-apart top and bottom of the panel that intersect to form voids with interspersed support posts interconnecting the top and bottom of the panel in areas not encompassed by the mutually offset holes.

According to another embodiment of the invention, the mutually offset holes are selected from the group consisting of circular, rectangular and hexagonal holes.

According to another embodiment of the invention, the mutually offset holes are the same shape and size.

According to another embodiment of the invention, the lattice panel is integrally formed.

According to another embodiment of the invention, a tray table for a passenger seat is provided that includes a three dimensional lattice panel structure forming a panel having a multitude of mutually offset holes formed in a respective spread-apart top and bottom of the panel and intersecting to form voids with interspersed support posts interconnecting the top and bottom of the panel in areas not encompassed by the mutually offset holes. An imperforate cover is positioned over the top of the panel to provide a support surface for an occupant seated aft of the tray table, and a pair of arms is attached to the panel structure for mounting the panel structure to a seat positioned forward of the aft-seated occupant.

According to another embodiment of the invention, the multitude of mutually offset holes formed in the top of the panel are circular, the mutually offset holes formed in the bottom of the panel are circular, and the multitude of mutually offset holes formed in the top of the panel and the mutually offset holes formed in the bottom of the panel intersect to form voids with interspersed support posts interconnecting the top and bottom of the panel in areas not encompassed by the mutually offset holes. The support posts define in cross-section arcuate wall segments corresponding to the shape and position of arcuate portions of the holes formed in the top of the panel and the holes formed in the bottom of the panel.

According to another embodiment of the invention, the posts are spaced-apart around the periphery of the holes formed in the top of the panel and the holes formed in the bottom of the panel.

According to another embodiment of the invention, the holes formed in the top of the panel and the holes formed in the bottom of the panel define respective intermediate top and bottom panel portions that isolate the holes formed in the top of the panel from each other, and isolate the holes formed in the bottom of the panel from each other. The posts define intermediate voids by which the holes formed in the top of the panel and the holes formed in the bottom of the panel communicate with each other.

According to another embodiment of the invention, a tray table for a passenger seat is provided that includes a three dimensional, integrally-formed lattice panel structure forming a panel having a multitude of mutually offset circular holes of the same shape and size formed in a respective top and bottom of the panel and intersecting to form voids with interspersed support posts interconnecting the top and bottom of the panel in areas not encompassed by the mutually offset holes. The multitude of mutually offset holes formed in the top of the panel are circular, and the mutually offset holes formed in the bottom of the panel are circular. The multitude of mutually offset holes formed in the top of the panel and the mutually offset holes formed in the bottom of the panel intersect to form voids with interspersed support posts interconnecting the top and bottom of the panel in areas not encompassed by the mutually offset holes. The support posts define in cross-section arcuate wall segments corresponding to the shape and position of arcuate portions of the holes formed in the top of the panel and the holes formed in the bottom of the panel. An imperforate cover is positioned over the top of the panel to provide a support surface for an occupant seated aft of the tray table, and an imperforate cover encloses the bottom of the panel. A pair of arms are attached to the panel structure for mounting the tray table to a seat positioned forward of the aft-seated occupant.

According to another embodiment of the invention, the posts are spaced-apart around the periphery of the holes formed in the top of the panel and the holes formed in the bottom of the panel.

According to another embodiment of the invention, the holes formed in the top of the panel and the holes formed in the bottom of the panel define respective intermediate top and bottom panel portions that isolate the holes formed in the top of the panel from each other and isolate the holes formed in the bottom of the panel from each other. The posts define intermediate voids by which the holes formed in the top of the panel and the holes formed in the bottom of the panel communicate with each other.

According to a method according to the invention, a panel structure is formed, comprising the steps of forming a multitude of holes in a top of the panel structure, and forming a multitude of holes in a bottom of the panel structure, wherein the holes in the bottom of the panel structure and the holes in the top of the panel structure are mutually and concentrically-offset intersect to form voids with interspersed support posts interconnecting the top and bottom of the panel in areas not encompassed by the mutually offset holes.

In accordance with another embodiment of the invention, the step of forming the holes in the top and bottom includes the step of forming holes selected from the group consisting of circular, rectangular and hexagonal holes.

In accordance with another embodiment of the invention, the step of forming the holes in the top and bottom includes the step of forming holes that are the same shape and size.

In accordance with another embodiment of the invention, the step of forming the lattice panel includes the step of integrally forming the lattice panel.

In accordance with another embodiment of the invention, the lattice panel is a table component of a tray table assembly adapted for use in an aircraft passenger cabin.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
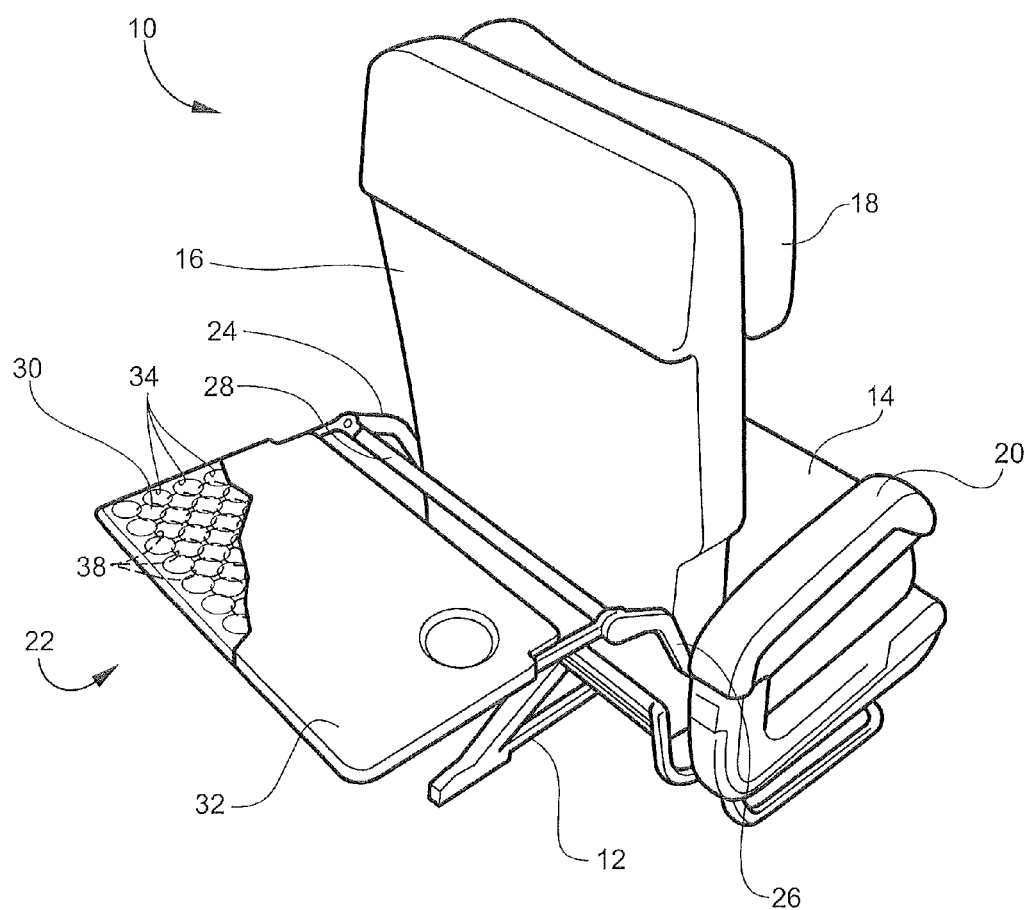
FIG. 1 is a perspective view of an aircraft passenger seat including a tray table fabricated of a lattice panel according to one embodiment of the invention.

Referring now specifically to the drawings, an aircraft passenger seat 10 is shown, which includes a base 12, a seat bottom 14, seat back 16, head rest 18, arm rest 20 and a tray table 22 mounted in a conventional manner on a pair of arms 24, 26 and a cross-member 28. The tray table includes a lattice panel 30 according to one embodiment of the invention overlaid with a thin plastic imperforate cover 32. The tray table 22 is exemplary of many uses of the lattice panel 30 and is used by way of example only. Because of the substantial amount of material that is removed in the formation process, weight is substantially reduced while maintaining strength and rigidity.

Figure 2:
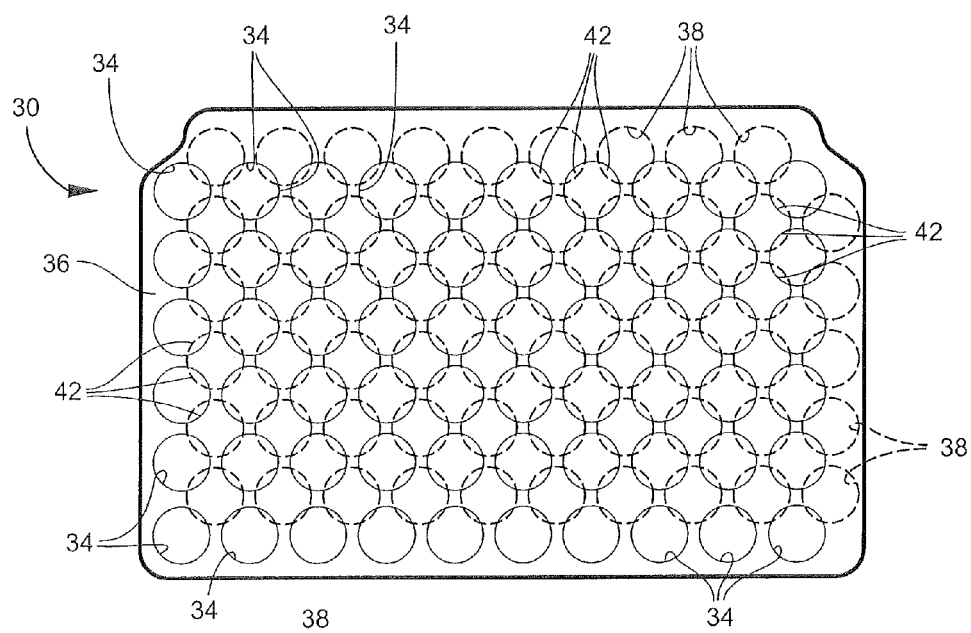
FIG. 2 is a top plan view of the lattice panel of the tray table shown in FIG. 1.
Figure 3:
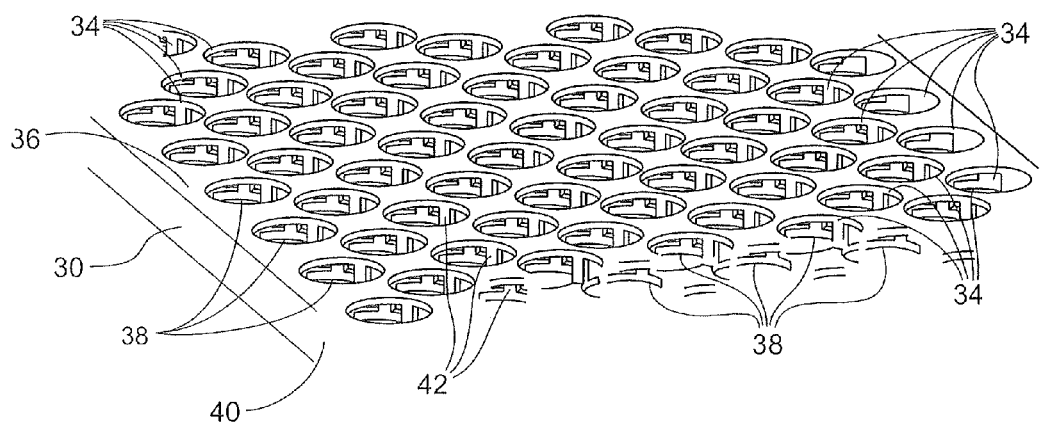
FIG. 3 is a perspective cross-sectional view illustrating where material is removed to form the lattice panel.

As is best shown in FIGS. 2 and 3, the lattice panel 30 is formed of a multitude of holes 34 in a regular array on a top side 36, and which extend through the thickness of the panel 30 except to the extent that the holes 34 are offset with regard to holes 38 formed in the bottom side 40 of the panel 30. The holes 38 are offset with respect to the holes 34 in the manner shown, leaving a multitude of spaced support posts 42, shown in FIG. 3, which provide both light weight and rigidity to the panel 30. The resulting structure has three distinct aspects: through voids where the holes 34 and 38 overlap, offset areas having the thickness of the top 36 and bottom 40 where the holes 34 and 38 do not overlap, and support posts 42 which are integral to the panel 30 and extend from the top surface of the top 36 to the bottom surface of the bottom 40. The support posts 42 are orthogonal, i.e., are axially mutually perpendicular to the machining tool direction or injection molding draw direction.

In appropriate applications the panel 30 can be left bare to allow free air flow through its thickness. In other applications, for example, the tray table 22 of FIG. 1, the panel 30 may be provided with a cover, such as cover 32 on one or both sides to form an imperforate structure. The cover 32 may be attached by an adhesive, by shrink-wrapping or any other suitable method.

Figure 4:
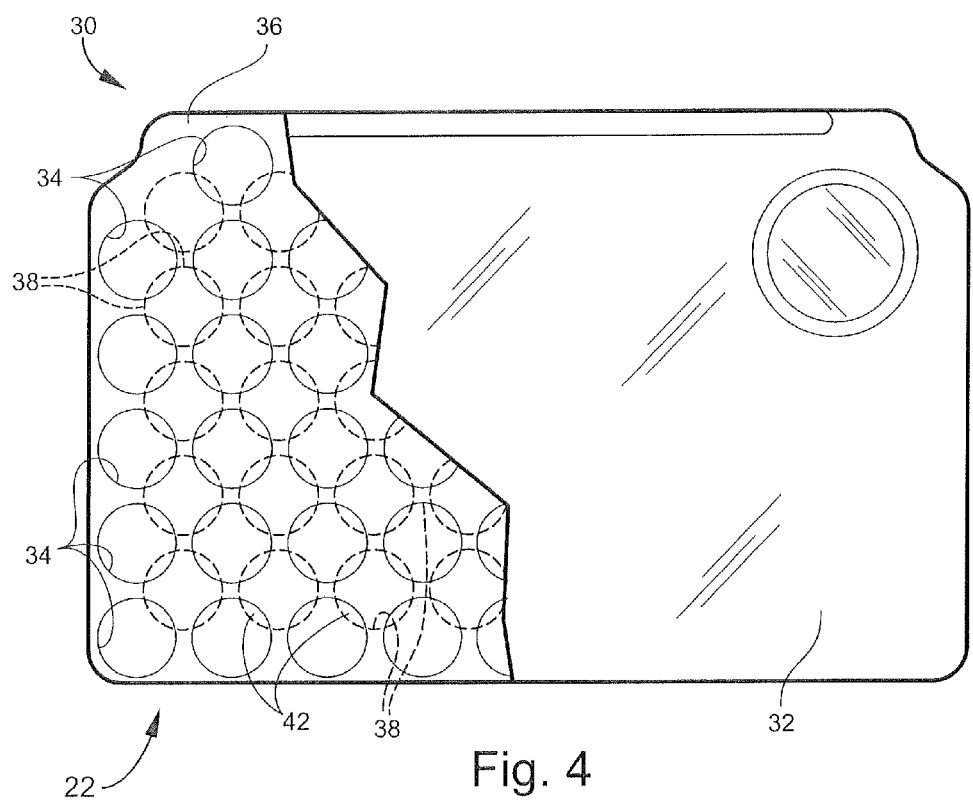
FIG. 4 is a top plan schematic view showing the structure of the lattice panel of FIGS. 1-3.

The above-described geometry is further illustrated in FIG. 4, where the two dimensional hole patterns are shown to generate the desired three dimensional geometry. The solid lines represent the holes 34 in the top 36 and the dashed lines represent holes 38 created from the bottom 40. The areas not encompassed by either a solid or dashed profile represent the support posts 42.

Figure 5:
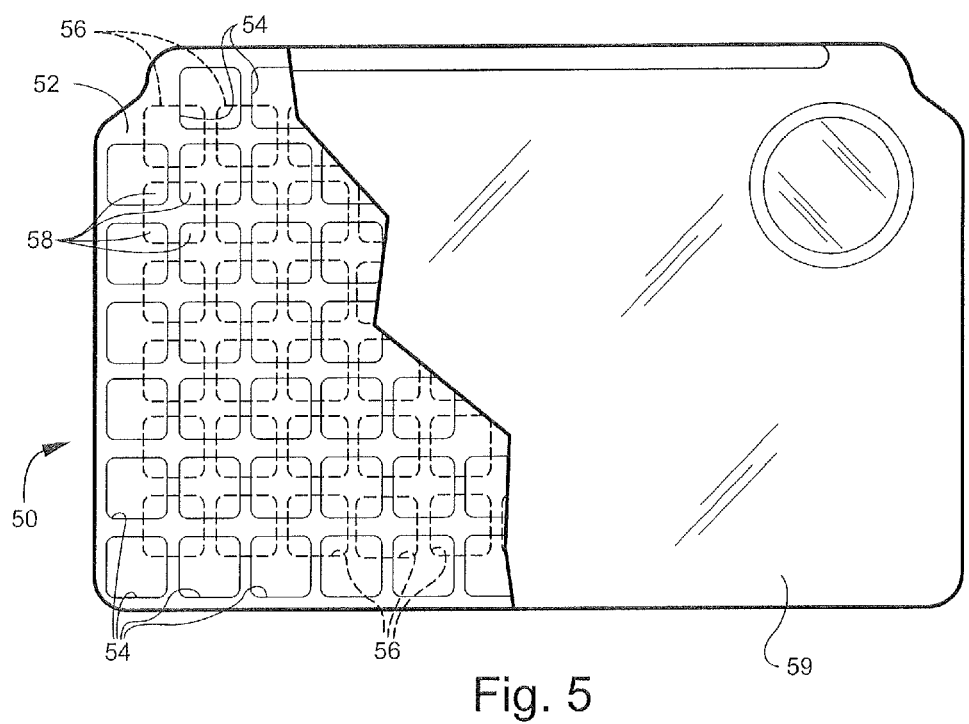
FIG. 5 is a top plan schematic view showing an alternative structure of a lattice panel wherein the holes forming the lattice are rectangular.

An alternative geometry is illustrated in FIG. 5, again shown for purposes of illustration as a tray table 50 fabricated of a panel lattice panel 52. The panel 52 is formed of holes 54 in the top of the panel 52, shown in solid lines, and is offset from holes 56, shown by dashed lines, in the bottom of the panel 52. The areas not encompassed by either solid or dashed lines represent support posts 58. The optional cover 59 is also shown.

Figure 6:
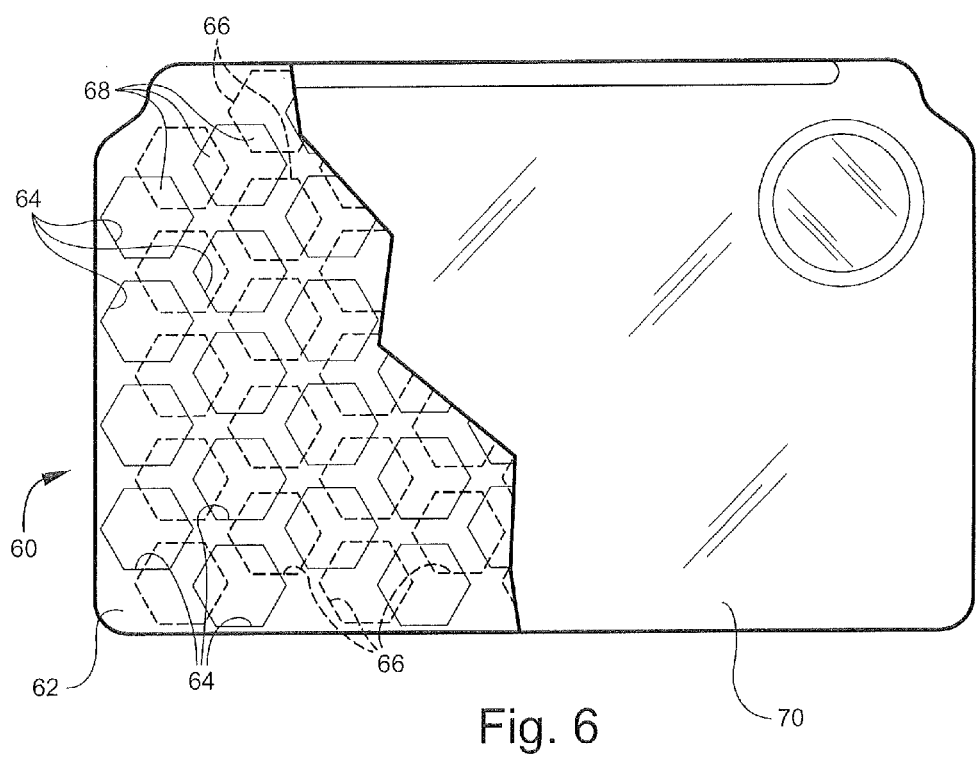
FIG. 6 is a top plan schematic view showing another alternative structure of a lattice panel wherein the holes forming the lattice are hexagonal.

A further alternative geometry is illustrated in FIG. 6, again shown for purposes of illustration as a tray table 60 fabricated of a panel lattice panel 62. The panel 62 is formed of holes 64 in the top of the panel 62, shown in solid lines, and is offset from holes 66, shown by dashed lines, in the bottom of the panel 62. The areas not encompassed by either solid or dashed lines represent support posts 68. The optional cover 70 is also shown.

Other geometrical shapes may be utilized, including without limitation, triangular, ovoid, pentagonal, octagonal or any other suitable shape that permits formation of the three aspects of the structure discussed above. Formation of the lattice panel structure is not critical to a specific formation technique, and while it is believed that formation techniques that result in an integral, one-piece structure is optimal, formation of two or more separate components that are then assembled to form the lattice structure is accommodated within the scope of the invention.

As used herein, the term "hole" means any opening, void or cavity having either a circular or non-circular shape or profile, and extending either partially through or completely through the thickness of the structure. The structure can be produced by any suitable manufacturing process, such as by molding, casting, machining, laser-cutting, 3-dimensional printing, or the like.

Similarly, while the embodiments disclosed in this application illustrate the invention with holes of the same shape and size in respective embodiments, lattices with regular arrays of holes of different shapes and/or sizes on one or both sides are accommodated within the scope of the invention.

A lattice panel structure according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A tray table for a passenger seat, comprising:
   (a) a three dimensional lattice panel structure having a multitude of mutually offset holes formed in a respective spaced-apart top and bottom of the panel and intersecting to form voids with interspersed support posts interconnecting the top and bottom of the panel in areas not encompassed by the mutually offset holes, the mutually offset holes being circular and the support posts defining in cross-section arcuate wall segments corresponding to a shape and position of arcuate portions of the holes formed in the top of the panel and the holes formed in the bottom of the panel;
   (b) an imperforate cover positioned over the top of the panel to provide a support surface for an occupant seated aft of the tray table; and
   (c) a pair of arms attached to the panel structure for mounting the panel structure to a seat positioned forward of the aft-seated occupant.

2. A tray table according to claim 1, wherein the mutually offset holes are the same shape and size.

3. A tray table according to claim 1, wherein the lattice panel is integrally formed.

4. A tray table according to claim 1, and including an imperforate cover enclosing the bottom of the panel.

5. A tray table according to claim 1, wherein the support posts are spaced-apart around the periphery of the holes formed in the top of the panel and the holes formed in the bottom of the panel.

6. A tray table according to claim 5, wherein the holes formed in the top of the panel and the holes formed in the bottom of the panel define respective intermediate top and bottom panel portions that isolate the holes formed in the top of the panel from each other, isolate the holes formed in the bottom of the panel from each other, and further wherein the support posts define intermediate voids by which the holes formed in the top of the panel and the holes formed in the bottom of the panel communicate with each other.

7. A tray table for a passenger seat, comprising:
   (a) a three dimensional, integrally-formed lattice panel structure having a multitude of mutually offset circular holes of the same shape and size formed in a respective top and bottom of the panel and intersecting to form voids with interspersed support posts interconnecting the top and bottom of the panel in areas not encompassed by the mutually offset holes, wherein:
      (i) the mutually offset holes formed in the top of the panel are circular;
      (ii) the mutually offset holes formed in the bottom of the panel are circular;
      (iii) the mutually offset holes formed in the top of the panel and the mutually offset holes formed in the bottom of the panel intersect to form voids with interspersed support posts interconnecting the top and bottom of the panel in areas not encompassed by the mutually offset holes;
      (iv) the support posts define in cross-section arcuate wall segments corresponding to the shape and position of arcuate portions of the holes formed in the top of the panel and the holes formed in the bottom of the panel;
   (b) an imperforate cover positioned over the top of the panel to provide a support surface for an occupant seated aft of the tray table;
   (c) an imperforate cover enclosing the bottom of the panel; and
   (d) a pair of arms attached to the panel structure for mounting the panel structure to a seat positioned forward of the aft-seated occupant.

8. A tray table according to claim 7, wherein the posts are spaced-apart around the periphery of the holes formed in the top of the panel and the holes formed in the bottom of the panel.

9. A tray table according to claim 7, wherein the holes formed in the top of the panel and the holes formed in the bottom of the panel define respective intermediate top and bottom panel portions that isolate the holes formed in the top of the panel from each other, isolate the holes formed in the bottom of the panel from each other, and further wherein the posts define intermediate voids by which the holes formed in the top of the panel and the holes formed in the bottom of the panel communicate with each other.

* * * * *